US012110725B2

(12) United States Patent
Schulz

(10) Patent No.: US 12,110,725 B2
(45) Date of Patent: Oct. 8, 2024

(54) NON-CONTACT, AUTOMATIC DOOR HINGE OPERATOR SYSTEM

(71) Applicant: Joseph M. Schulz, Homestead, FL (US)

(72) Inventor: Joseph M. Schulz, Homestead, FL (US)

( * ) Notice: Subject to any disclaimer, the term of this patent is extended or adjusted under 35 U.S.C. 154(b) by 0 days.

(21) Appl. No.: 18/366,591

(22) Filed: Aug. 7, 2023

(65) Prior Publication Data

US 2024/0018820 A1 Jan. 18, 2024

Related U.S. Application Data

(63) Continuation-in-part of application No. 17/016,138, filed on Sep. 9, 2020, now Pat. No. 11,719,035.

(51) Int. Cl.
*E05F 15/627* (2015.01)
*E05F 15/77* (2015.01)

(52) U.S. Cl.
CPC ............ *E05F 15/627* (2015.01); *E05F 15/77* (2015.01); *E05Y 2201/664* (2013.01); *E05Y 2400/44* (2013.01); *E05Y 2900/132* (2013.01)

(58) Field of Classification Search
CPC ......... E05F 15/627; E05F 15/76; E05F 15/77; E05F 2014/763; E05Y 2900/132; E05Y 2400/66; E05Y 2400/854
USPC ............................................................ 49/325
See application file for complete search history.

(56) References Cited

U.S. PATENT DOCUMENTS

| | | | | |
|---|---|---|---|---|
| 11,002,058 B1 * | 5/2021 | Boor | E05F 15/616 |
| 11,719,035 B2 * | 8/2023 | Schulz | E05F 15/77 49/324 |
| 2005/0217075 A1 * | 10/2005 | Enomoto | E05F 15/63 16/285 |
| 2022/0074251 A1 * | 3/2022 | Schulz | E05F 15/77 |
| 2023/0202373 A1 * | 6/2023 | Walker | B60P 1/435 296/146.1 |
| 2024/0018820 A1 * | 1/2024 | Schulz | E05F 15/627 |

FOREIGN PATENT DOCUMENTS

| | | | |
|---|---|---|---|
| KR | 20220138503 A * | 10/2022 | |
| KR | 20230080377 A * | 6/2023 | |
| KR | 20230130422 A * | 9/2023 | |
| WO | WO-9631677 A1 * | 10/1996 | E05F 1/1016 |
| WO | WO-2011098528 A1 * | 8/2011 | E05F 15/627 |
| WO | WO-2022002646 A1 * | 1/2022 | E05F 1/1066 |
| WO | WO-2022002647 A1 * | 1/2022 | |

* cited by examiner

*Primary Examiner* — Jerry E Redman
(74) *Attorney, Agent, or Firm* — Ray K. Shahani, Esq.

(57) ABSTRACT

A non-contact, automatic door hinge operator system that allows a common door to be opened and closed automatically through use of a voice-activated sensor, optical switch or mobile app.

10 Claims, 14 Drawing Sheets

FIG. 3D
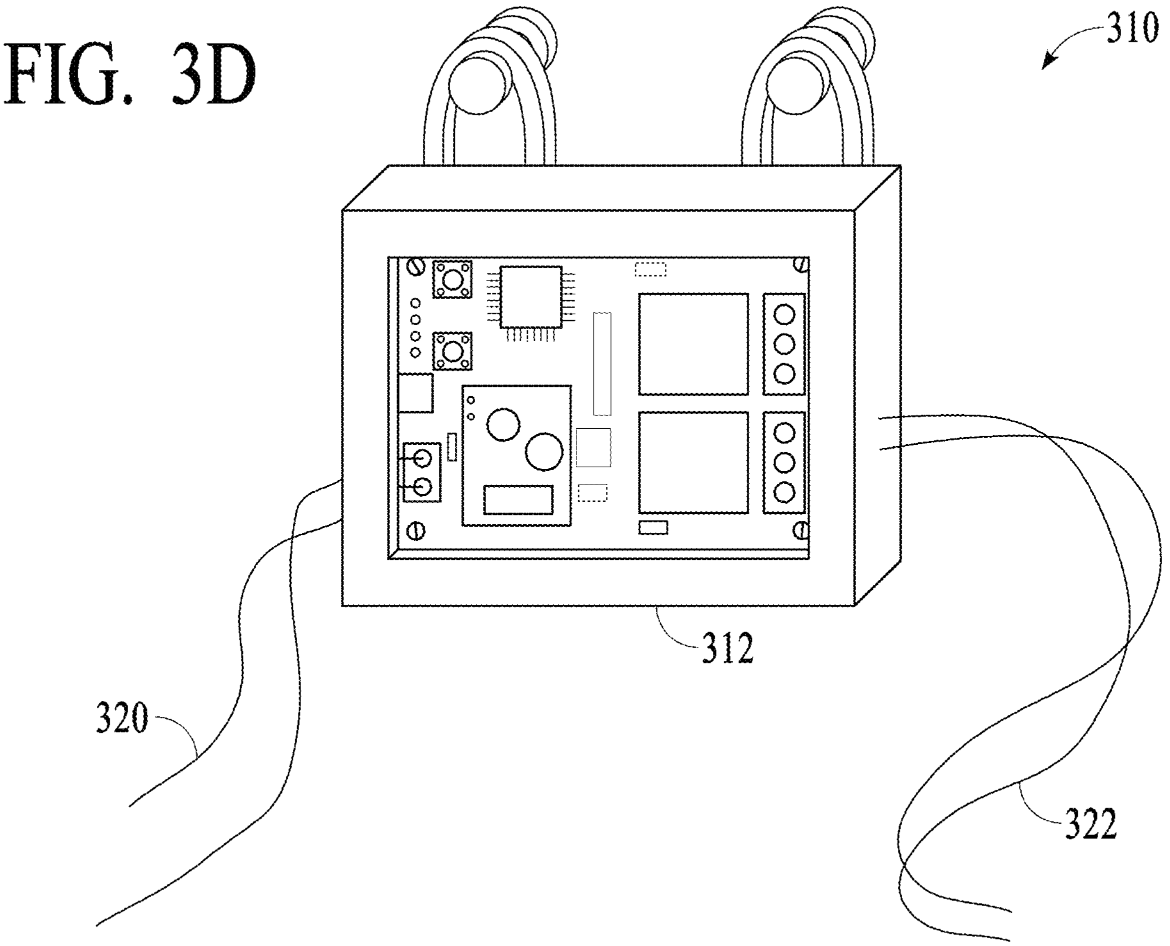
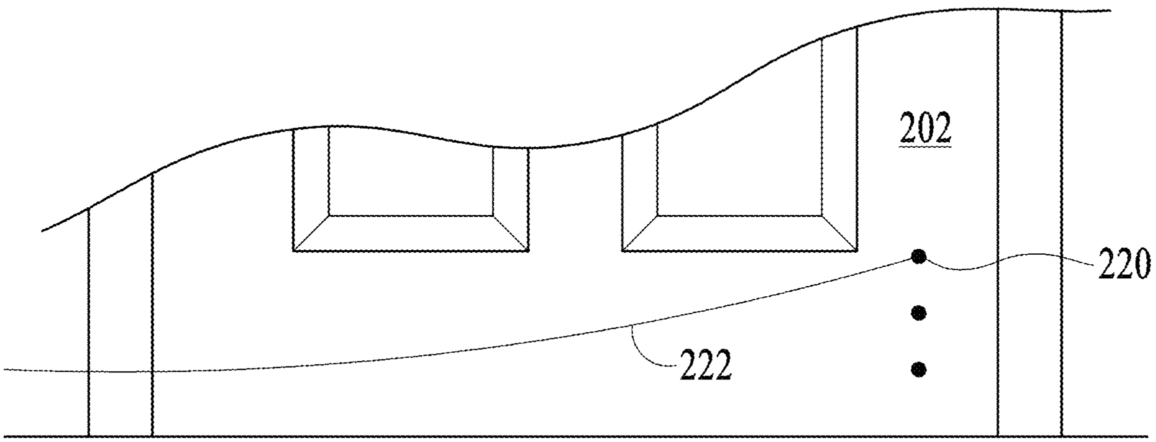
FIG. 4

FIG. 7A

Android

FIG. 7B

Apple

FIG. 7C

NON-CONTACT, AUTOMATIC DOOR HINGE OPERATOR SYSTEM

RELATED APPLICATIONS

This application is a Continuation-In-Part Application of Nonprovisional patent application Ser. No. 17/016,138 filed Sep. 9, 2020 entitled NON-CONTACT, AUTOMATIC DOOR HINGE OPERATOR SYSTEM, U.S. Pat. No. 11,719,035 issued Aug. 8, 2023, which is incorporated herein by reference in its entirety, and claims any and all benefits to which it is entitled therefrom.

FIELD OF THE INVENTION

The present invention is related to methods and apparatus for controlling the opening and closing of a door, and more particularly, to a system that can be installed on a common door and is activated manually, via touchless sensor, voice command or mobile computing device app.

BACKGROUND OF THE INVENTION

Common non-contact ways of opening doors in public locations such as grocery stores and other retail establishments include pressure sensors located in front of the door and optical detection systems that actuate the door opener when a person moves to a location in front of the door.

However, there are no non-contact door hinge operators on the market today or taught in the prior art that are actuated via remote signal processing such as a voice-controlled or via mobile app or other computing device.

Mobile computing device software applications, also known as "apps", have become ubiquitous with the advent of smart phones. One app entitled "eWeLink—Smart Home" is available at the Google Play Store located at the following location: https://play.google.com/store/apps/details?id=com.coolkit&hl=en_US This app is related to home automation. Home automation or domotics is building automation for a home, called a smart home or smart house. A home automation system will control lighting, climate, security systems, but to date such systems have not been used to control internal doors in personal residences or commercial operations.

Alexa is Amazon's cloud-based voice service available on hundreds of millions of devices from Amazon and third-party device manufacturers. With Alexa, app developers can build natural voice experiences that offer customers a more intuitive way to interact with the technology they use every day. Amazon offers a collection of tools, APIs, reference solutions, and documentation to make it easier to build apps for Alexa. Unique Alexa skills can be created for connecting Alexa to devices, or integrating Alexa directly into third-party products. Developers can engage Amazon's Alexa Solution Provider network for a range of services including strategy, pre-tested reference architectures and hardware, hardware and software development, manufacturing, and go-to-market support. However, prior to the present invention, there is no technology available for automatically operating a door hinge using smart technology such as Alexa.

SUMMARY OF INVENTION AND ADVANTAGES

It would be desirable to have a non-contact, automatic door hinge operator system that opens and closes a door or other hinge-operated device without requiring a user to manually open and close the door.

It would be a further advantage to have a non-contact, automatic door hinge operator system that can be operated using an electronic touch-less switch, photocell, motion or proximity sensor, optical switch, other optical sensor, or smart phone and associated app.

It would be a further advantage to have a non-contact, automatic door hinge operator system that can be built into a new construction door, or that can be installed on an existing door.

It would be a further advantage to have a non-contact, automatic door hinge operator system retrofit or upgrade kit that can be installed onto an existing door.

It would be a further advantage to have a non-contact, automatic door hinge operator system retrofit or upgrade kit that utilizes a pull-cord with spool and motor mechanism that opens a door.

It would be a further advantage to have a non-contact, automatic door hinge operator system retrofit or upgrade kit that utilizes a pull-cord with spool and motor mechanism that closes a door.

It would be a further advantage to have a non-contact, automatic door hinge operator system retrofit or upgrade kit that utilizes a pull-cord with spool and motor mechanism that both opens and closes a door.

It would be a further advantage to provide a non-contact, automatic door hinge operator system retrofit or upgrade kit that utilizes a pull-cord with spool and motor mechanism that opens or closes a door having one or more spring-loaded hinges.

It would be a further advantage to provide a non-contact, automatic door hinge operator system retrofit or upgrade kit that utilizes a motor mechanism with rotating mandrel and off-set hinge pin that opens and closes a door as the mandrel is rotated clockwise or counterclockwise.

It would be a further advantage to provide a non-contact, automatic door hinge operator system wherein at least one hinge on a door can be opened and closed using an electronic actuator built into the hinge.

In a preferred embodiment of the present invention, the motor, spool mechanism and controller can be mounted directly onto the door itself, both being run by battery power. The spool is attached to the door and the distal end of the pull cord or pull wire is anchored into the wall. Thus, the door would essentially pull itself open or closed, depending on whether using a door normally closed system or a door normally open system.

Benefits and features of the invention are made more apparent with the following detailed description of a presently preferred embodiment thereof in connection with the accompanying drawings, wherein like reference numerals are applied to like elements.

BRIEF DESCRIPTION OF THE DRAWINGS

FIG. 3D is a representative detail view a 2-way motor controller switch inside a harness to operate the spool motor mechanism of a door hinge operator system of the present invention.

FIG. 4 is a representative detail view of a pull-string mounted onto a door for pulling the door open when actuated by the spool motor mechanism of a door hinge operator system of the present invention.

FIGS. 7A-7C are QR codes for downloading eWeLink and Alexa apps from the internet.

DETAILED DESCRIPTION OF THE INVENTION

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

Figure 1A:
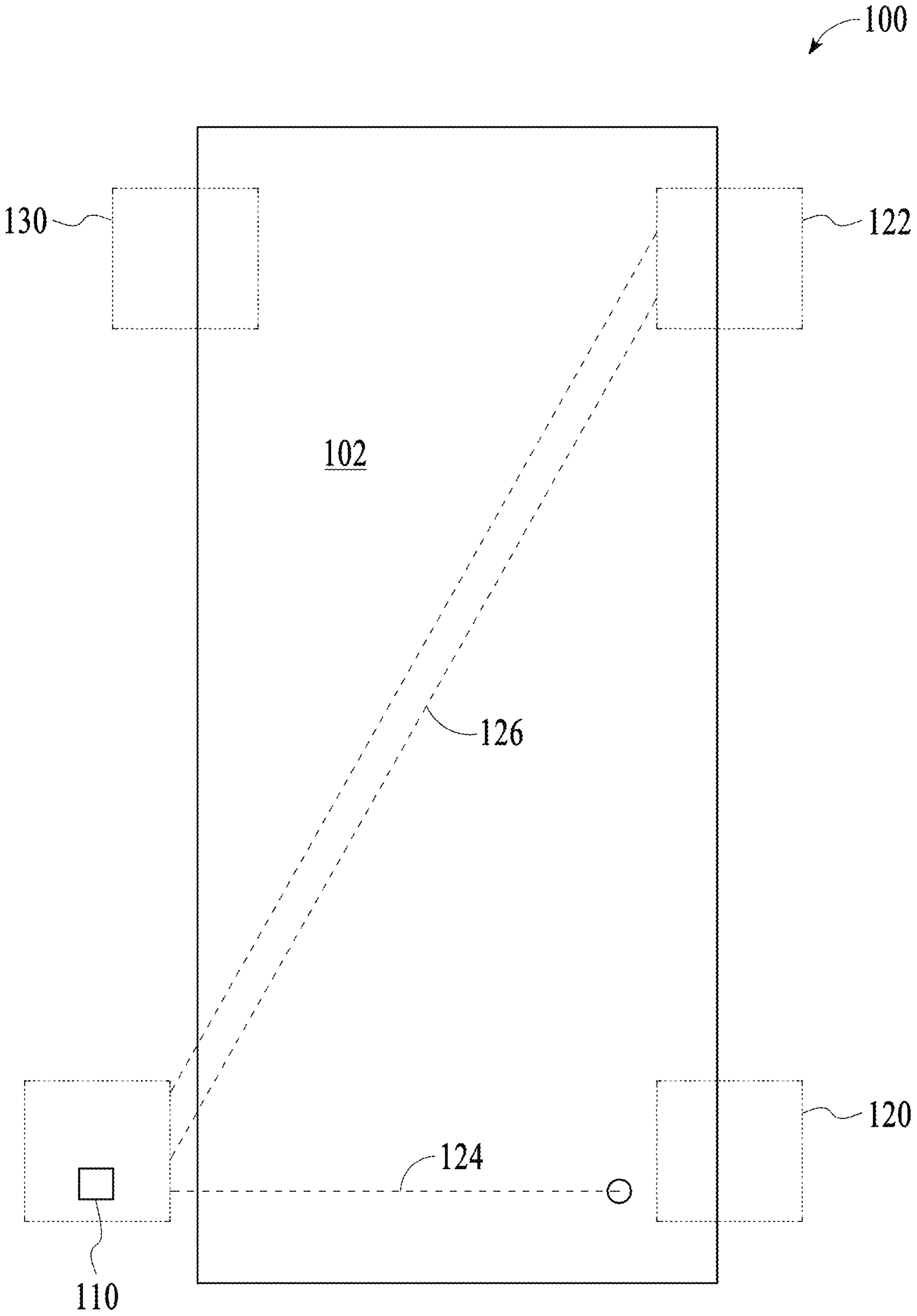
FIG. 1A is a representative overall schematic view of an embodiment of the door hinge operator system of the present invention.

FIG. 1A is a representative overall schematic view of an embodiment of the door hinge operator system 100 of the present invention. In a preferred embodiment, the door 102 can be a standard, common residential or commercial door, port, hatch or other compartment cover. Adjacent the lower left-hand portion of the door 102 there is a motor mechanism 110. The door 102 also has a front-facing access pierce point 120 and a rear-facing access pierce point 122 with pull wire 124 extending between the motor mechanism 102 and the front-facing access pierce point 120 and with pull wire 126 extending between the motor mechanism 102 and the rear-facing access pierce point 122. In a preferred embodiment, operation of the door 102 is controlled by actuator such as a spring loaded hinge 130.

In general, it will be understood that the door hinge operator system 100 of the present invention consists of a worm gear box electric motor, mounting apparatus and connectors. A pull cord, wire or string 124 and 126 is stored in a spool and connected through the door 102 to open the door 102, and at least one hinge that is spring-driven or otherwise actuated hinge 130 to return the door 102 to a closed position, or anywhere in between, said components to be more completely described below.

Figure 1B:
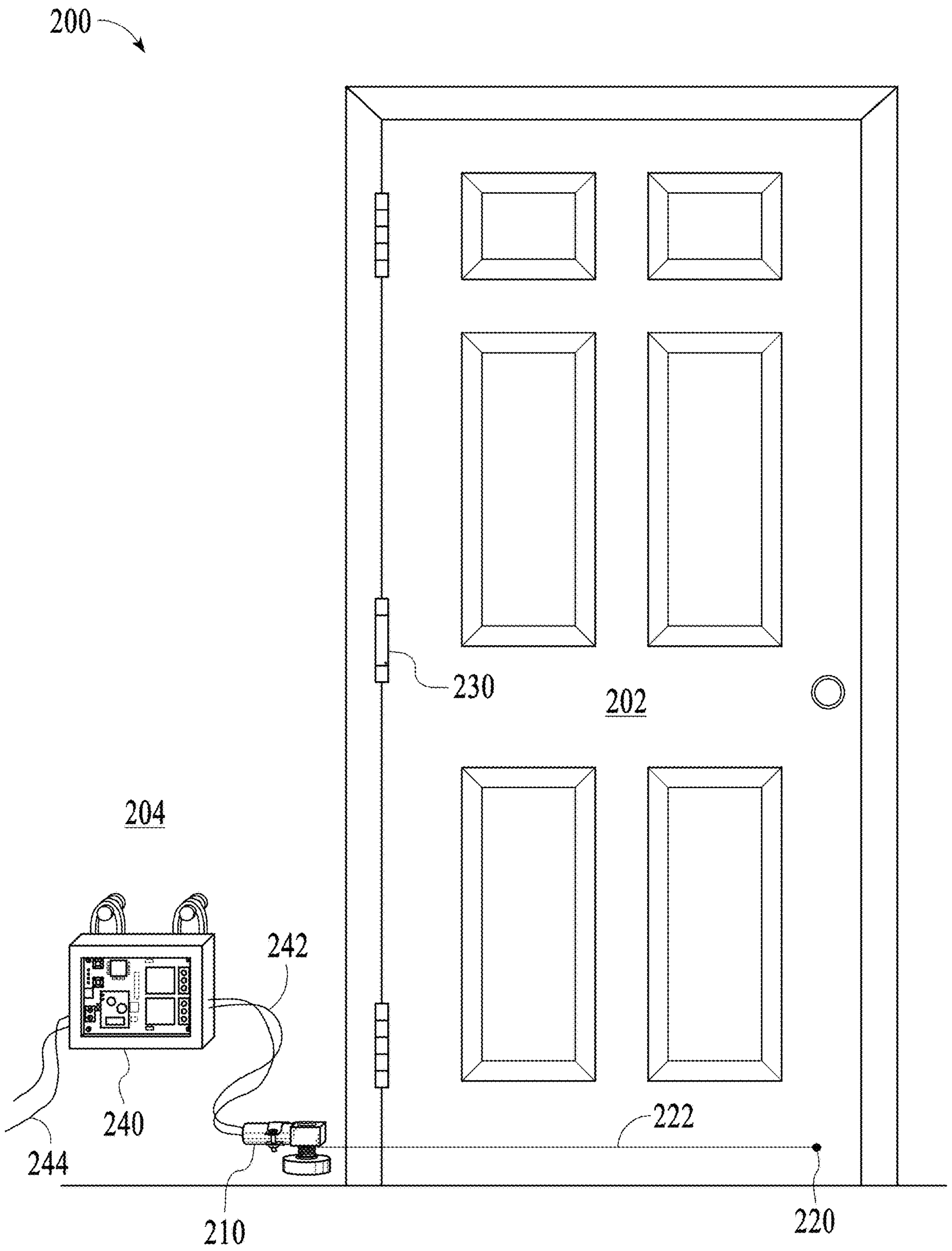
FIG. 1B is a representative view of an embodiment of the door hinge operator system of the present invention installed on a pre-existing door.

FIG. 1B is a representative view of an embodiment of the door hinge operator system 200 of the present invention installed on a pre-existing, enhanced door 202. The motor mechanism 210 is mounted on the wall 204 adjacent the enhanced door 202. Pull cord 222 extends from the motor mechanism 210 through front-facing access pierce point 220 and at least one of the hinges on the enhanced door 202 is a spring-loaded hinge 230. A control harness 240 mounted on the wall 204 provides a control signal via connecting wiring harness 242 connected to the motor mechanism 210 and receives operating power, data, externally-supplied control signal, and/or other signals or data from input wiring harness 244.

Figure 2A:
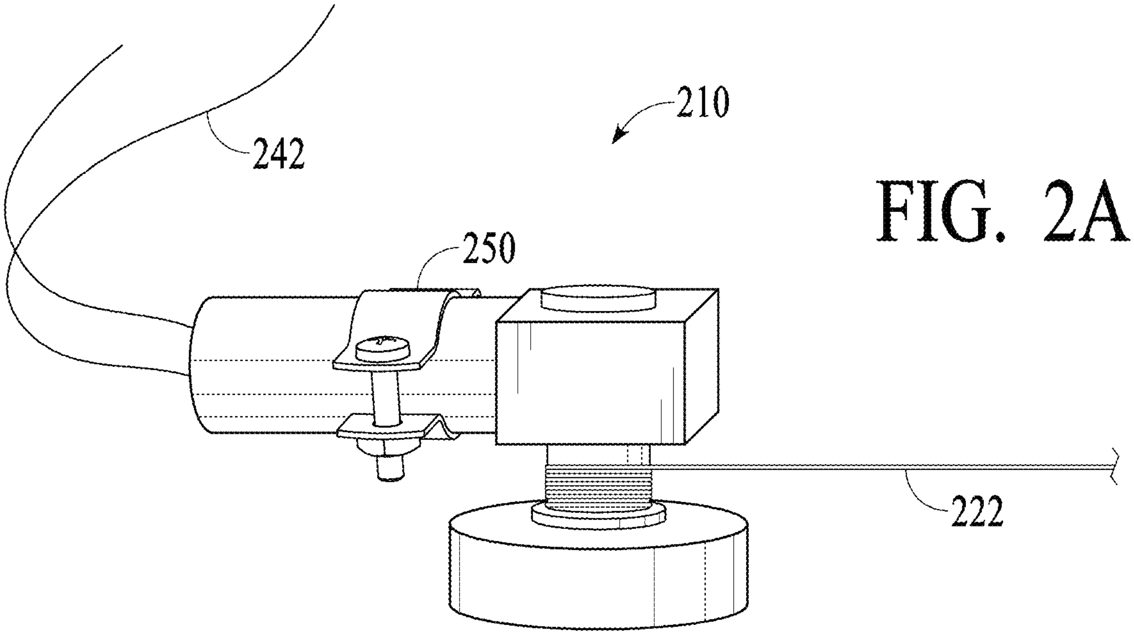
FIG. 2A is a representative view of an embodiment of the spool motor mechanism of a door hinge operator system of the present invention.
Figure 2B:
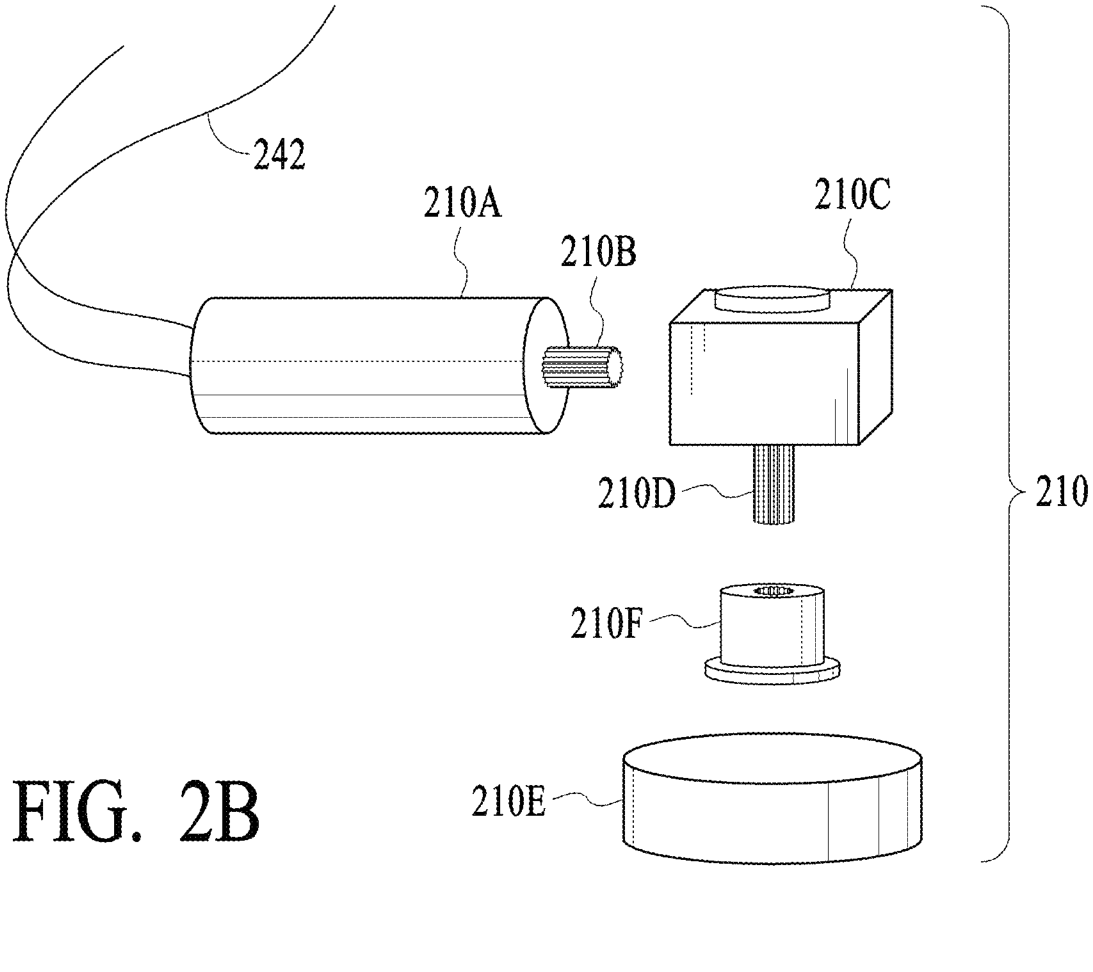
FIG. 2B is a representative exploded view of an embodiment of the spool motor mechanism of a door hinge operator system of the present invention.

FIG. 2A is a representative view of an embodiment of the spool motor mechanism 210 of a door hinge operator system 200 of the present invention. FIG. 2B is a representative exploded view of an embodiment of the spool motor mechanism 210 of a door hinge operator system 200 of the present invention. A clamping device 250 such as a conduit pipe clamp or hanger is used to mount the motor mechanism 210 to a static wall portion (not shown). The motor mechanism 210 is comprised principally of a wormgear motor portion 210A having a splined drive shaft 210B. Gear box 210C contains an output shaft 210D that couples to spool member 210E via flange coupler 210F.

As shown, pull cord, wire or string 222 winds onto flange coupler 210F, or could also wind onto spool member 210E, as desired. A range of materials and products would be useful for pull cord, wire or string 222 such as including, but not limited to, nylon line, braided nylon or metal cable, polyester or other suitable material. In general, while portions of the pull cord, wire or string 222 are flexible and wind around armature or spool members 210F or 210E, the central portions could be rigid tube or rod made of natural, metallic, composite, carbon fiber or similar material.

Figure 3A:
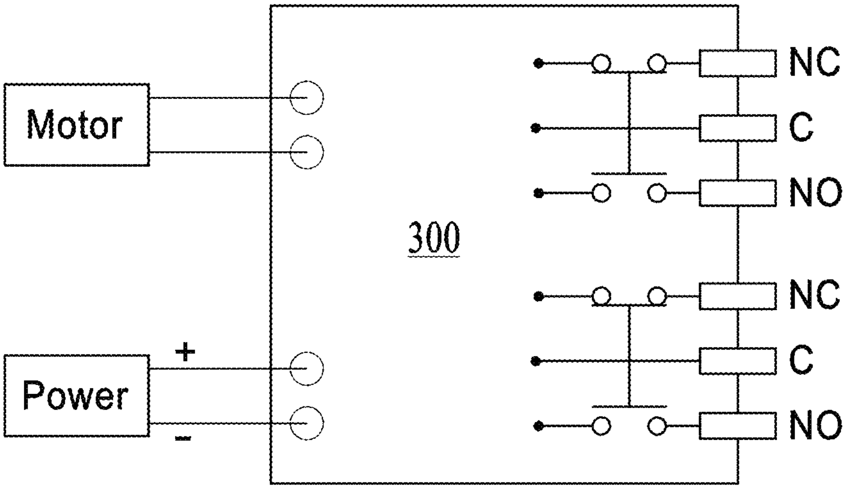
FIG. 3A is a representative circuit view of a 2-way switch used to operate the spool motor mechanism of a door hinge operator system of the present invention.
Figure 3B:
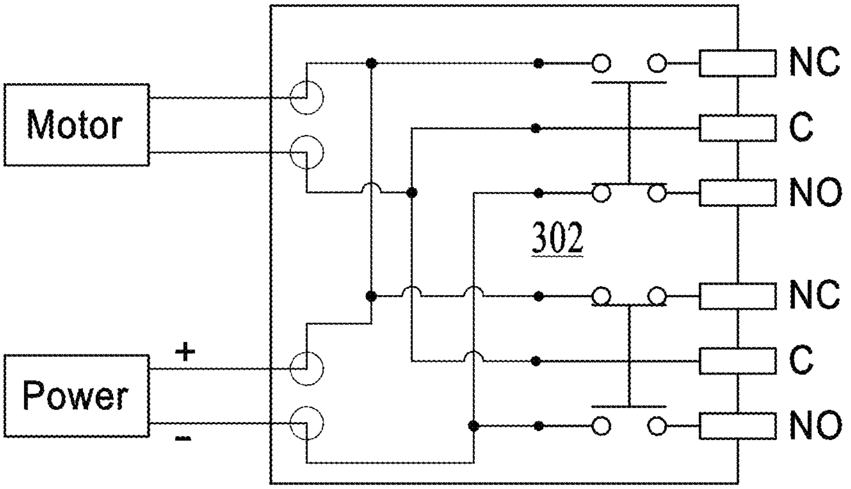
FIG. 3B is a representative circuit wiring diagram for clock-wise "left switch" of a 2-way switch used to operate the spool motor mechanism of a door hinge operator system of the present invention.
Figure 3C:
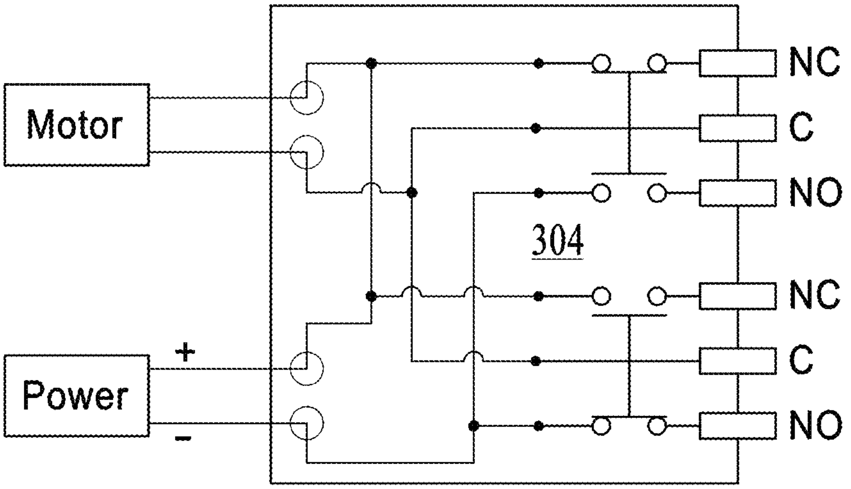
FIG. 3C is a representative circuit wiring diagram for counterclock-wise "right switch" of a 2-way switch used to operate the spool motor mechanism of a door hinge operator system of the present invention.

FIG. 3A is a representative circuit view of a 2-way switch 300 used to operate the spool motor mechanism 210 of a door hinge operator system 200 of the present invention. FIG. 3B is a representative circuit wiring diagram for clock-wise "left switch" 302 of a 2-way switch 300 used to operate the spool motor mechanism 210 of a door hinge operator system 200 of the present invention. FIG. 3C is a representative circuit wiring diagram for counterclock-wise "right switch" 304 of a 2-way switch 300 used to operate the spool motor mechanism 210 of a door hinge operator system 200 of the present invention.

It will be understood therefore that when the spool member 210E is to be rotated in a clock-wise direction, the "left switch" 302 would be operated and when the spool member 210E is to be rotated in a counterclock-wise direction, the "right switch" 304 would be used. Therefore, when the right switch 304 is activated, the spool 210E will begin to reel in the pull-wire 222 which will open the door. Furthermore, when the left switch 302 is activated, the spool 210E will release the pull-wire 222 and the spring-loaded hinge 230 will close the door.

FIG. 3D is a representative detail view a 2-way motor controller switch 310 inside a harness 312 to operate the spool motor mechanism 210 of a door hinge operator system 200 of the present invention. Power or other wiring harness 320 provide power to operate the switch 310. Data or other control signals can also be input to the switch 310 via wiring harness 320 for operating the door hinge operator system 200 of the present invention. Control output 322 couples to spool motor mechanism 210 for providing signal and/or power to open or close the door 202.

In a preferred embodiment of the controller 240 of the present invention, there are two manual switches on the controller 240, one would open the door 202, and one would close the door 202. It will be understood therefore that use of an app on a smart phone isn't necessary for operation of the door hinge operator system 200 of the present invention.

In yet another preferred embodiment of the controller 240 of the present invention, wiring harness 320 consists of 2 separate inputs to the controller 240, for example, one input is a power source that plugs directly into a circuit board on the controller 240. Another power source runs through a chamber, and wires into the backside of the controller 240, where it provides the spool motor mechanism 210 with a continuos power supply. It will be understood that either switch can be used to complete the circuit. Each switch sends a current through the motor 210 in a different direction, allowing the motor 210 to spin in different directions. In a preferred embodiment, there is a point of connection between the 12V power supply and the circuit board. A cord running out the mouth of the harness is the direction connection wires to the motor spool 210 itself.

FIG. 4 is a representative detail view of a pull cord 222 mounted onto a door 202 for pulling the door 202 open when actuated by the spool motor mechanism 210 of a door hinge operator system 200 of the present invention. The pull cord 202 extends adjacent the base portion of the door 202 up to and into access point 220.

Figure 5A:
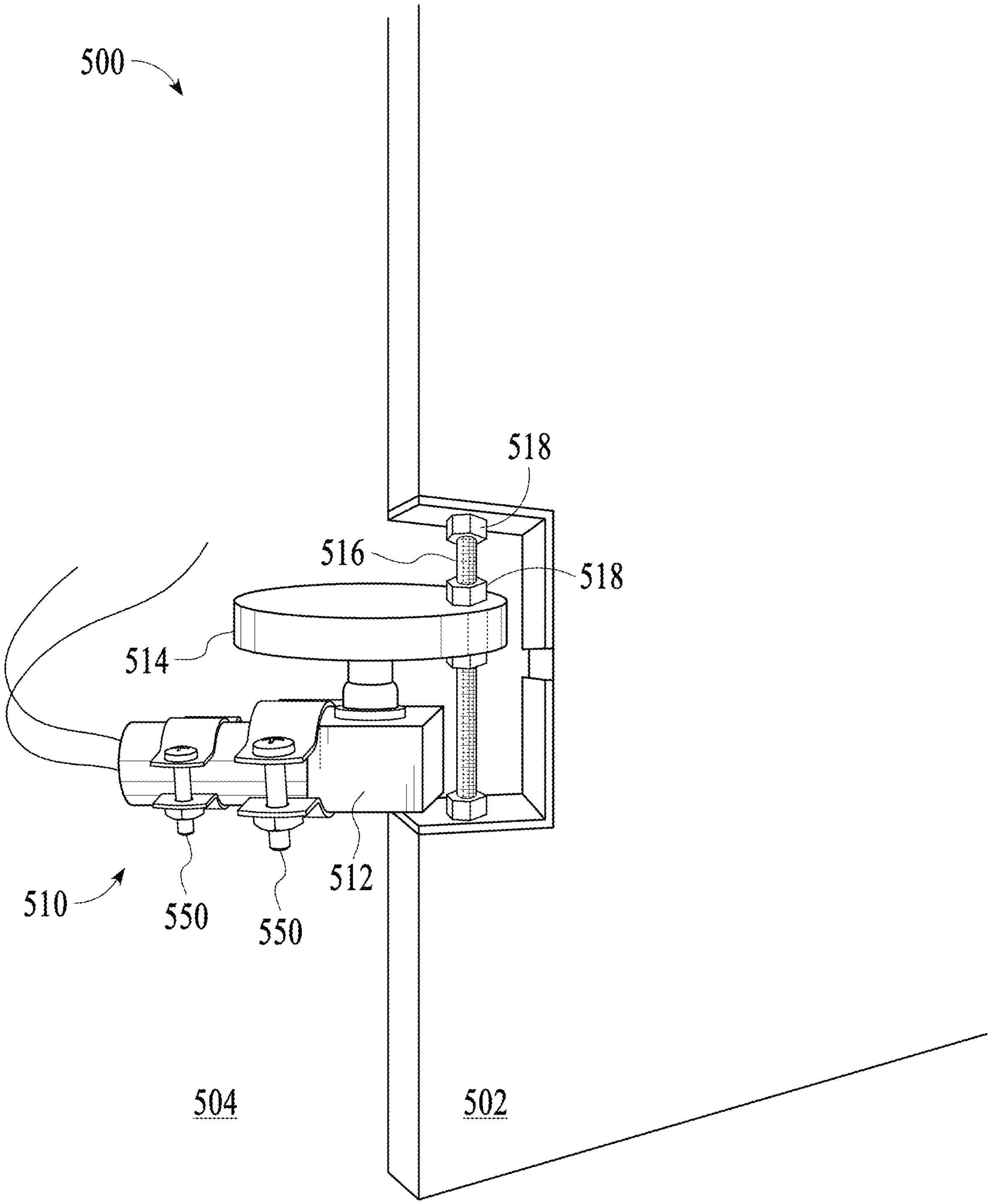
FIG. 5A is a representative perspective view of a spool motor mechanism of the door hinge operator system of the present invention through bolted onto a modified door.
Figure 5B:
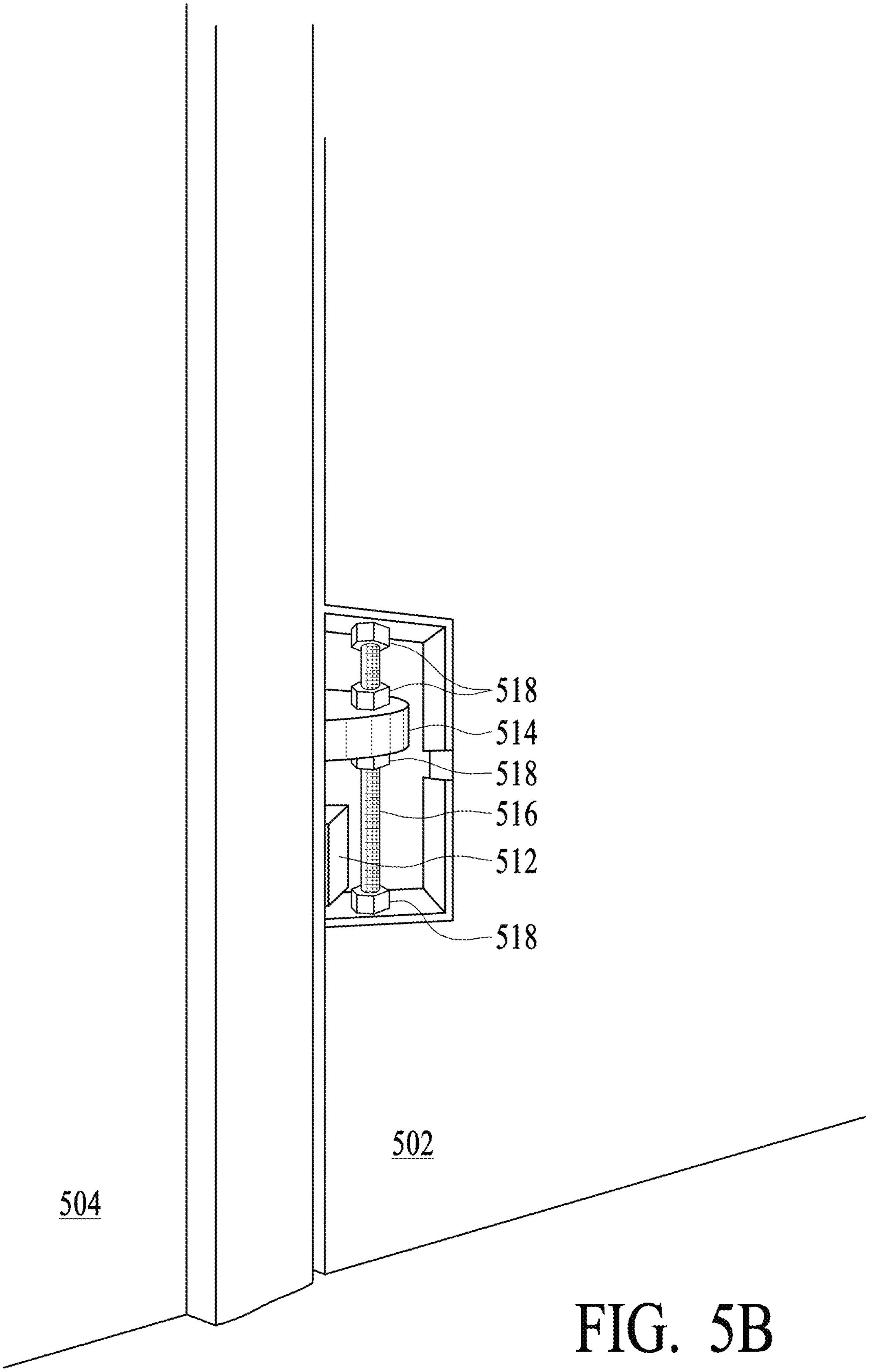
FIG. 5B is another representative perspective view of a spool motor mechanism of the door hinge operator system of the present invention through bolted onto an installed modified door.

FIG. 5A is a representative perspective view of a disk motor mechanism 510 of the door hinge operator system 500 of the present invention through bolted onto a modified door 502. FIG. 5B is another representative perspective view of a disk motor mechanism 510 of the door hinge operator system 500 of the present invention through bolted onto an installed modified door 502.

It will be understood that similar to the door hinge operator system shown in FIGS. 1A-2B, disk motor mechanism 510 is secured to the wall 504 adjacent the door 502 with clamp hangers 550. Power motor 512 rotates disk 514 clock-wise or counterclock-wise, as desired. Through bolt 516 set into notched opening 518 in door 502 extends through rotating disk 514 at a point 518 on the disk 514 off center of the disk 514 with the orientation of the door 502 fixed with respect to the orientation of the rotating disk 514. It will be understood that the disk motor mechanism 510 essentially replaces the lower hinge of the unmodified door (not shown). Thus, as the disk 514 rotates, through bolt 516 moves the door 502 tracking the position of the rotating disk 514, opening and closing as desired.

FIGS. 6A-6G representative drawings showing method steps for installation of an embodiment of the door hinge operator system 200 such as shown in FIGS. 1A-4.

Figure 6A:
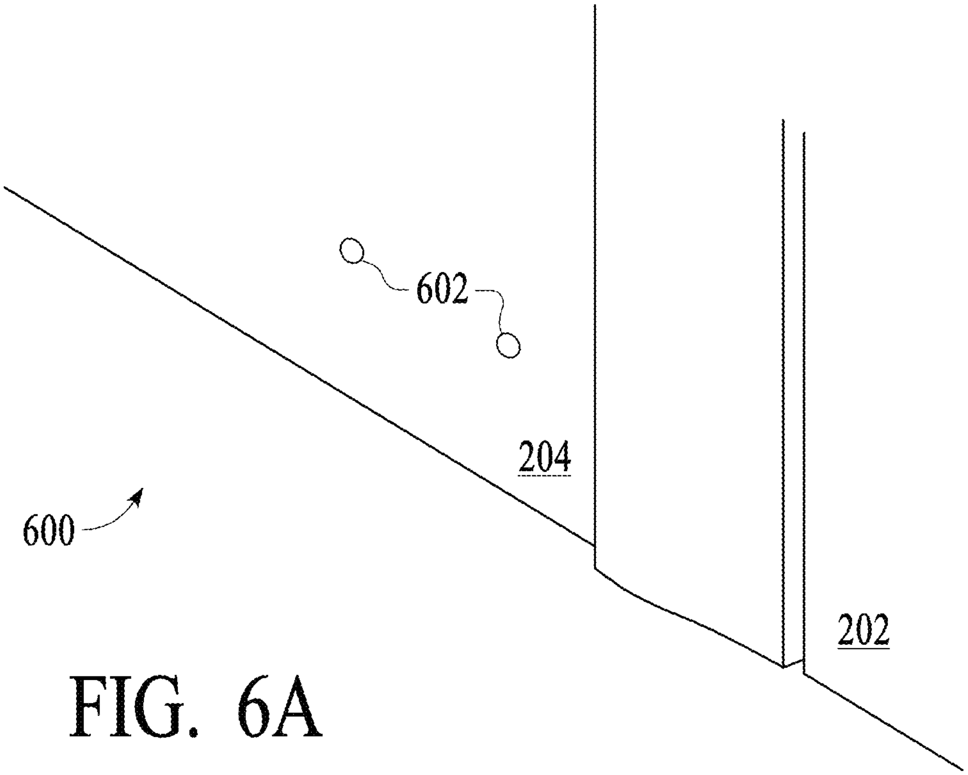
FIGS. 6A-6G are representative drawings showing method steps for installation of an embodiment of the door hinge operator system of the present invention.

In a first step 600 as shown in FIG. 6A, mounting holes 602 are drilled into a wall 204 adjacent the door 202 optionally having drywall anchors or removable threaded inserts (not shown) as desired.

Figure 6B:
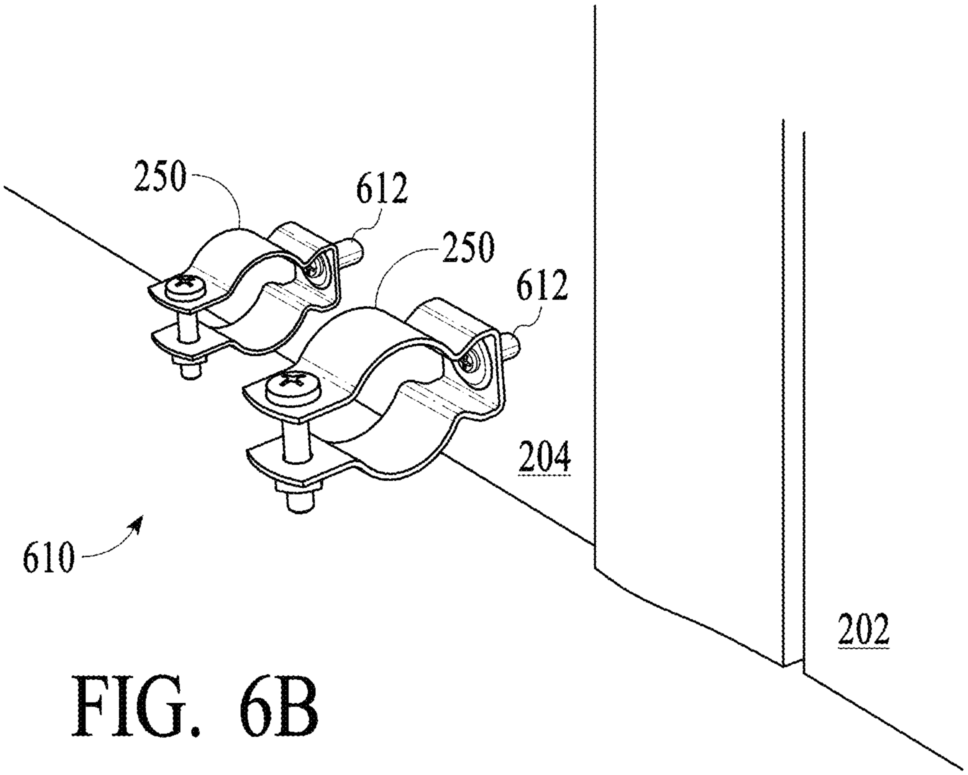

In a second step 610 as shown in FIG. 6B, coupling members such as conduit clamps or hangers 250 are installed using the mounting holes 602 drilled into the wall 204. Optionally, one or more spacers 612 can be installed to space or set the clamps 350 off the wall as desired.

Figure 6C:
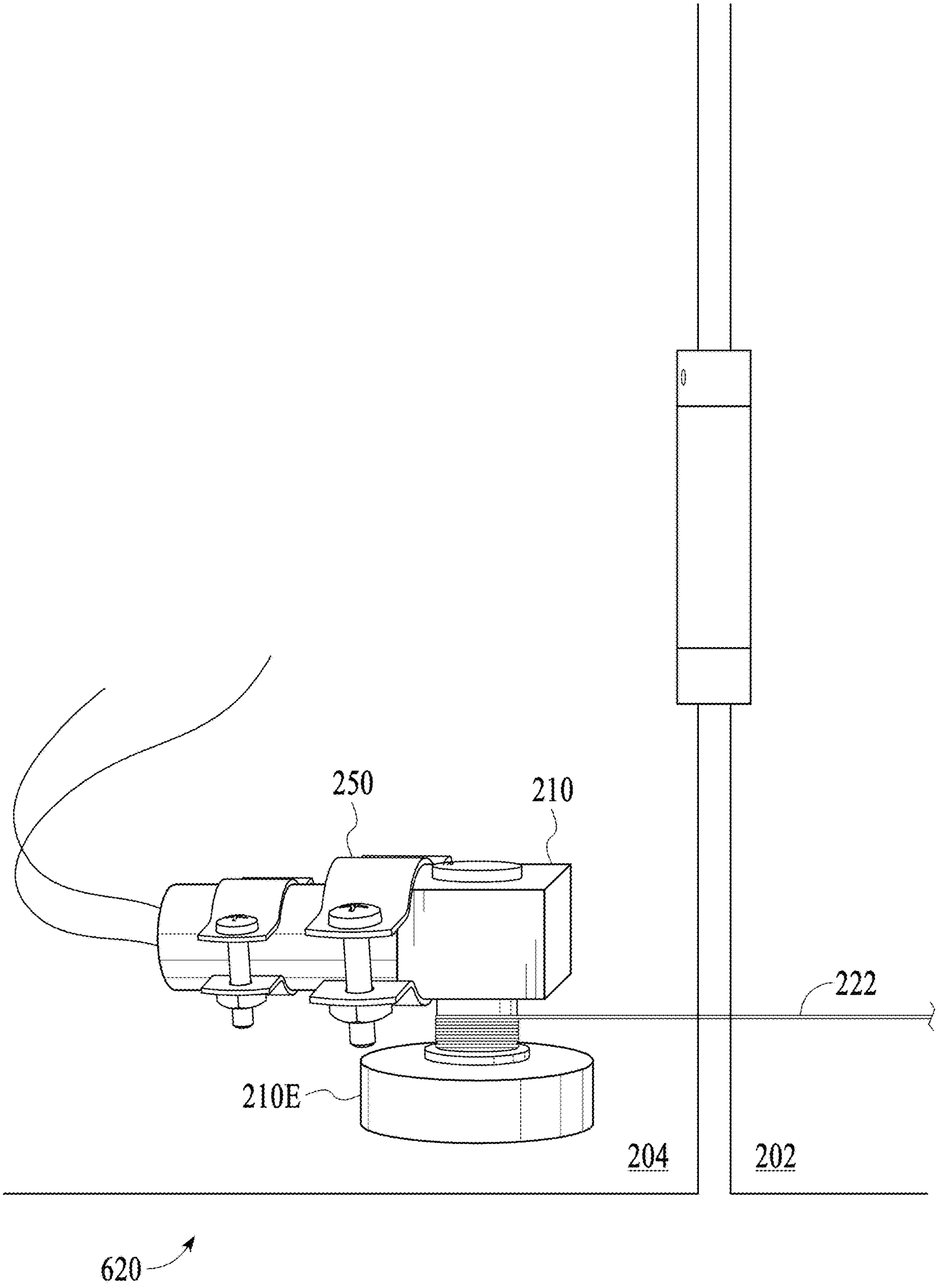

In a third step 620 as shown in FIG. 6C, the complete motor spool mechanism 210 is rigidly clamped into coupling members such as conduit clamps or hangers 250 Pull cord 222 extends from spool 210E as shown.

Figure 6D:
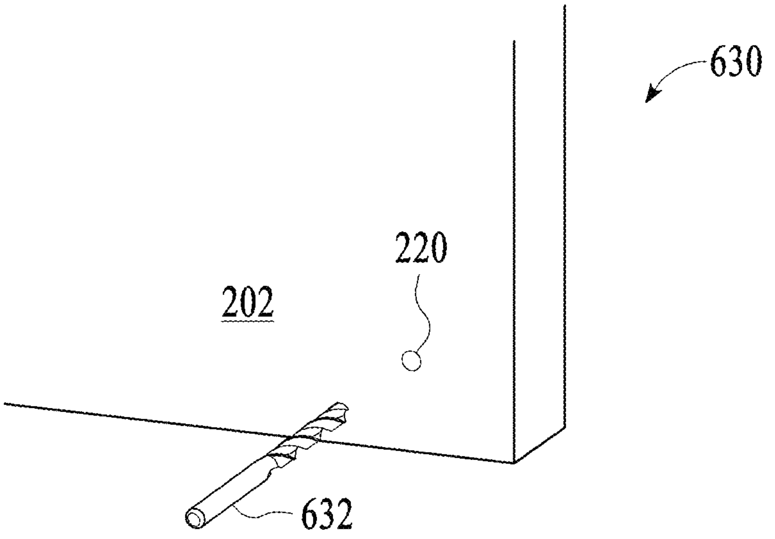

In a fourth step 630 as shown in FIG. 6D, a small hole or access point 220 is drilled into the door 202 with a drilling tool 632 such as will be known to those skilled in the art.

Figure 6E:
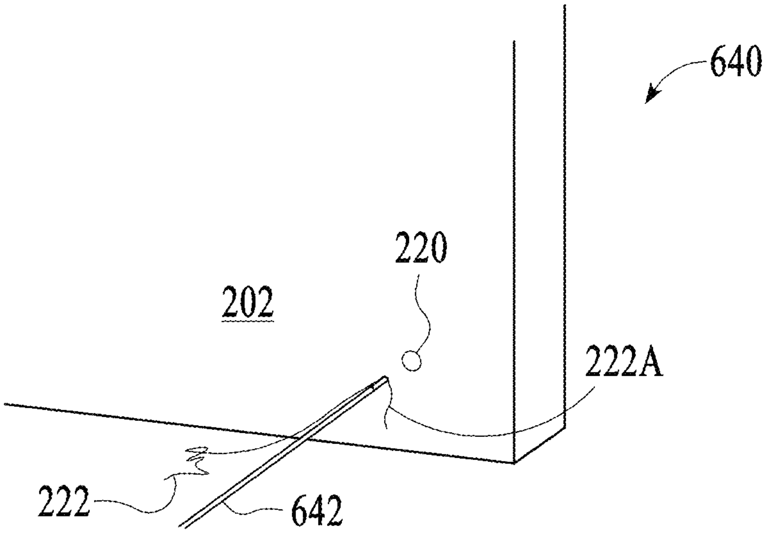

In a fifth step 640 as shown in FIG. 6E, the distal end 222A of pull cord 222 is threaded through the small hole or access point 220 drilled into the door 202 using a through rod tool 642 such as will be known to those skilled in the art.

Figure 6F:
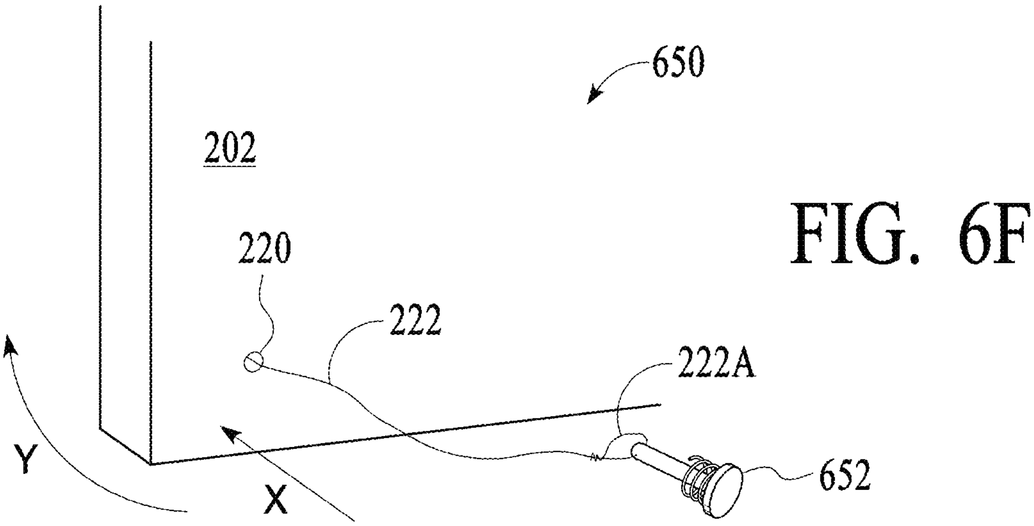

In a sixth step 650 as shown in FIG. 6F, the distal end 222A of the pull cord 222 is removed from the through rod device 642 and the distal end of the pull cord is then secured to a spring-loaded stopper member 652.

Figure 6G:
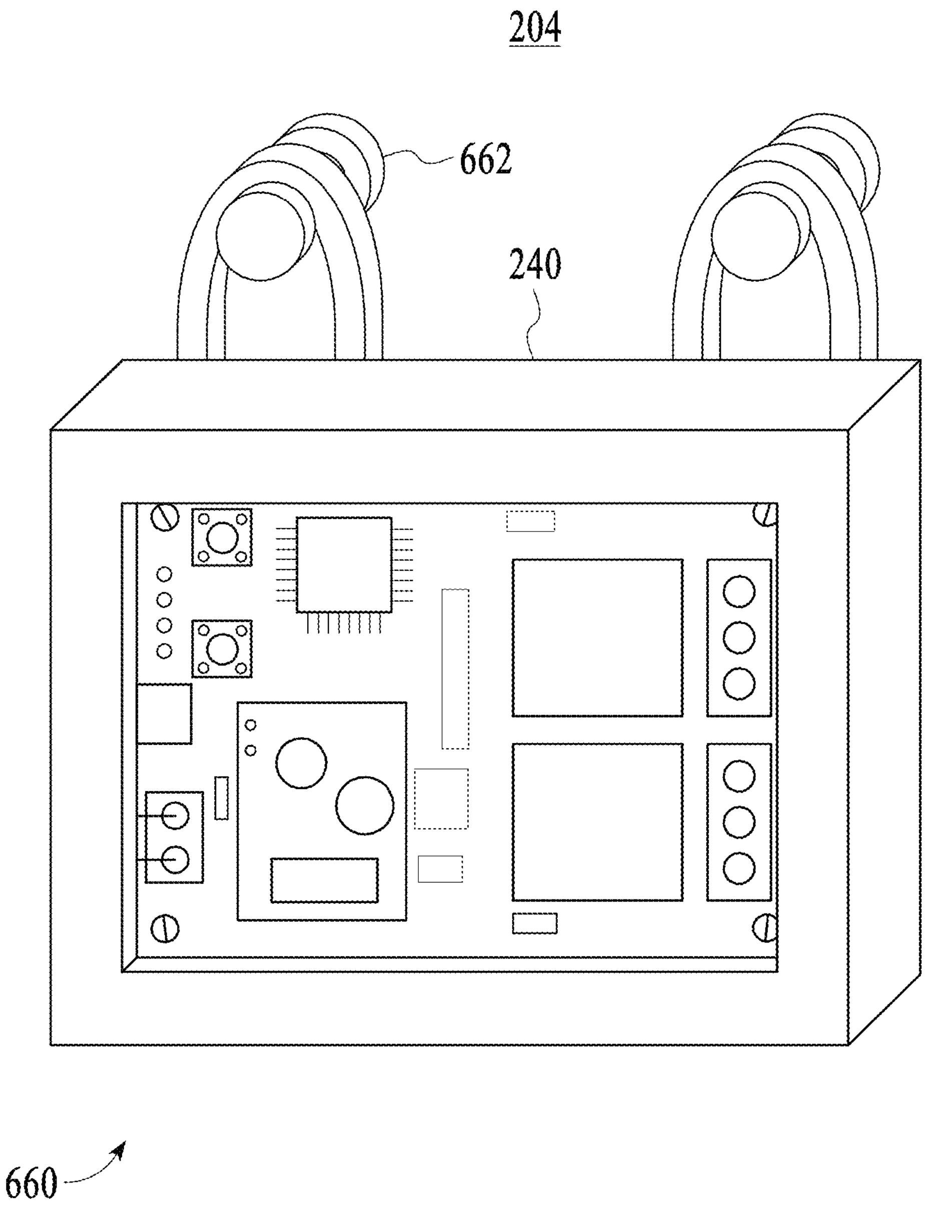

In a seventh step 660 as shown in FIG. 6G, controller 240 is mounted onto the wall 204 using mounting brackets 662. Power and/or control inputs 244 (as shown in FIG. 1B) can be buried in the wall 204. In another embodiment, controller 240 is powered by battery pack (not shown), and data or control signals can be sent to the controller 240 via laser, LED, infrared, bluetooth or cellular data signal. In addition, control output or other data output 242 (such as shown in FIG. 1B) can consist of wiring buried in the wall 204 or wireless connection to the motor mechanism such as infrared, bluetooth, cellular network, etc.

It will be understood that in operation, once the distal end 222A of the pull cord 222 is secured to the stopper member 652, as the pull cord 222 is withdrawn in direction X by rotation of the spool 210E on the spool motor mechanism 210 in a direction that results in winding the pull cord 222 onto the spool member 210E, stopper member 652 pulls the normally-closed door 202 open along door swing arc Y. As tension is maintained on the pull cord 222, the door 202 stays in the open position. However, once the tension in the pull cord 222 is released, the spring-operated hinge 230 acts to return the door 202 to its resting, closed position.

It will further be understood that the door hinge operator system 200 of the present invention is adapted for opening a normally-closed door 202 by using pull cord 222 to pull the door 202 open and keep it open until released and returned to a normally-closed position by force of the at least one spring-loaded hinge 230. However, in another preferred embodiment, a normally open door is pulled closed and held closed, as desired, using a pull-cord wound onto a motor-driven spool, and when the cord is released the at least one spring-loaded hinge operates to return the door to it's normally-open position.

It will further be understood by those skilled in the art that in another preferred embodiment of the door hinge operator system 200 of the present invention, a door can be opened and closed using a looped pull-cord that is controlled by a 2-way motor. Thus, when the spool motor mechanism is rotated in one way, the door can be opened, and when the motor is rotated in the other direction, the door closes, or vice versa. In such embodiment, and where desired, there is no need for a spring-loaded hinge 230 because as the spool motor turns in one direction, the door is opened, and when the motor is rotated in the other direction, the door closes.

Figure 6H:
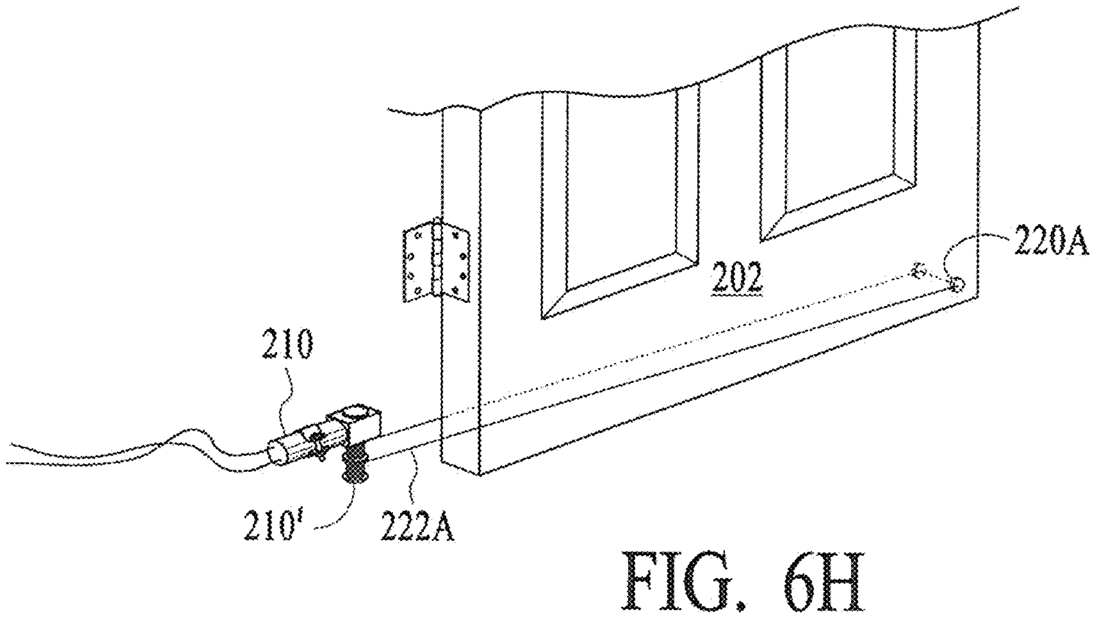
FIGS. 6H-6J are representative drawings installation of an alternate embodiment of the door hinge operator system of the present invention.
Figure 6I:
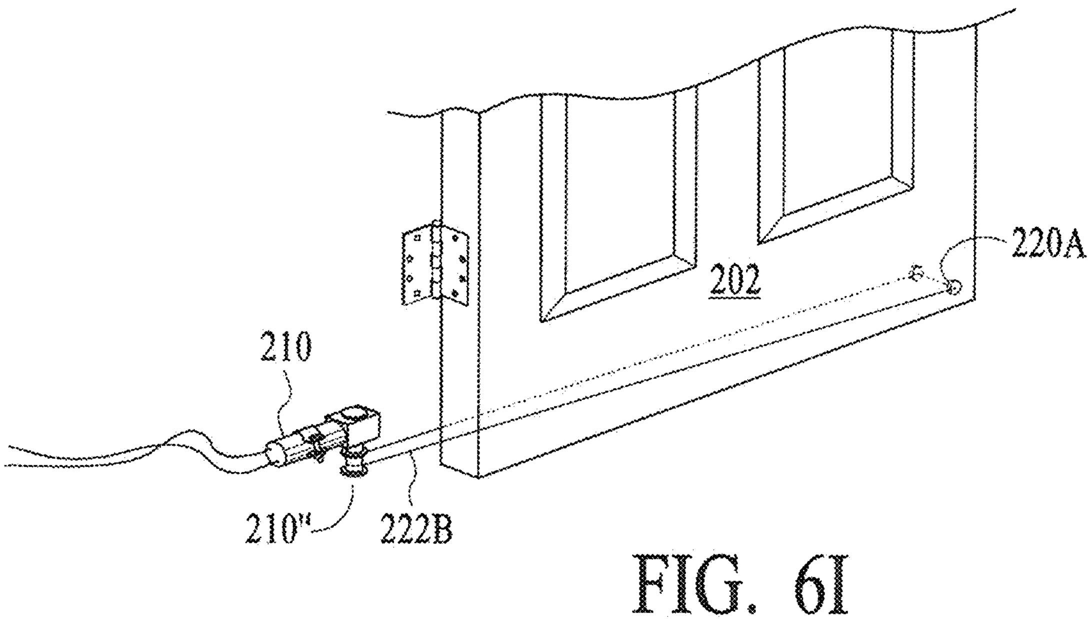
Figure 6J:
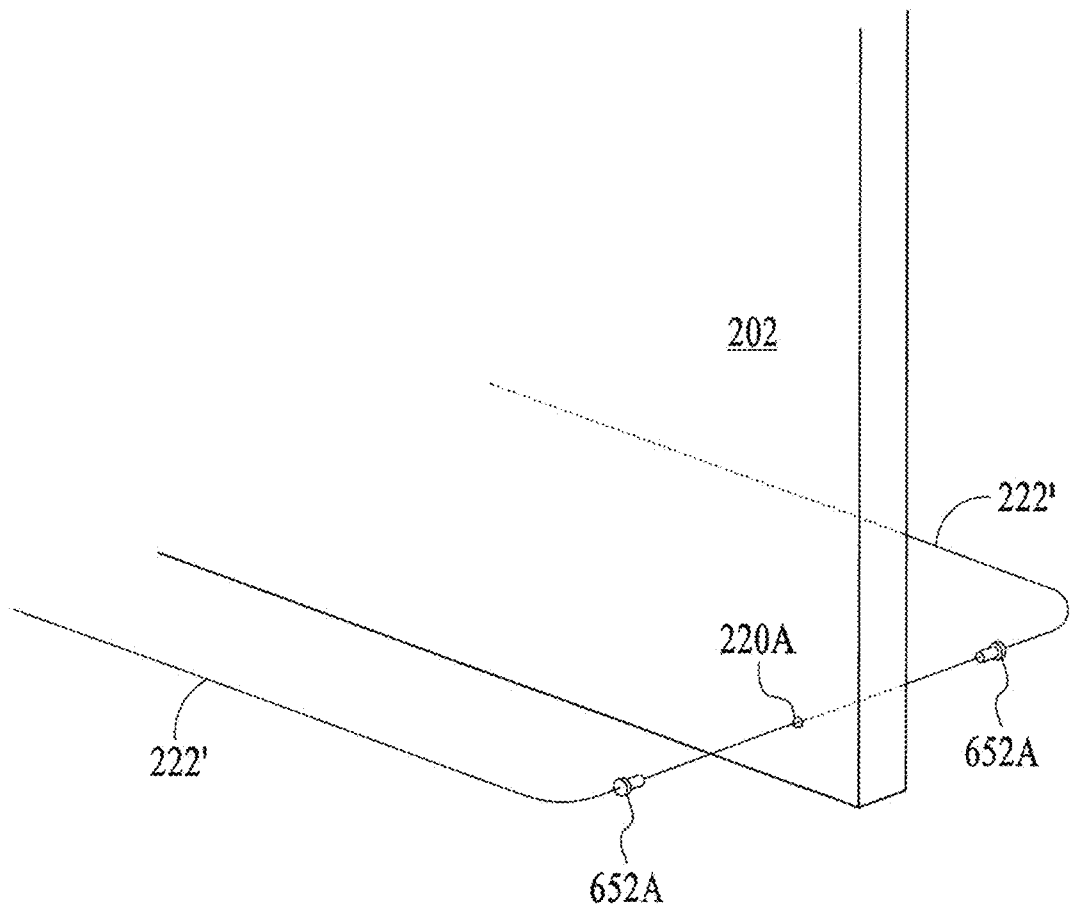

FIGS. 6H-6J are representative drawings installation of an alternate embodiment of the door hinge operator system of the present invention. As taught in the foregoing description, bi-directional motor 210 is powered and controlled as described herein.

As best shown in FIG. 6H, rotating 2-part spool portion 210' alternatingly pulls pull cord 222A in either directions as the motor is rotated. Spool portion 210' resembles the spool part used in a string trimmer or weed whacker. Pull cord 222A extends between the spool portion 210' and the distal connecting point 220A on the door 202 on either side of the door 202. As spool portion 210' rotates in one direction, pull cord 222A unwinds from a first side and winds onto spool 210' on the second side and door 202 opens. As spool portion 210' rotates in the alternate direction, pull cord 222A unwinds from the second side winds onto spool 210' on the first side as door 202 closes.

As best shown in FIG. 6J, pull cord section 222' is fixed and connected to door 202 with connecting pin 652A. As pull wire 222' passes through distal opening 220A through door 202, it is fixed to the other side of door 202 with connecting pin 652A, and returns to the motor-driven spool (not shown). Being fixed to the door 202, as the pull cord 222' is pulled from one side, the door 202 swings in one direction, and as the pull cord 222' is pulled from the other side, the door 202 swings in the other direction.

As best shown in FIG. 6H, rotating spool portion 210" pulls pull cord 222A in either direction. Spool portion 210" simply rotates in one direction and then the other, thereby acting on pull cord 222A that extends between spool portion 210" and the distal connecting point 220A on the door 202 on either side of the door 202. As spool portion 210" rotates in one direction, pull cord 222B pulls the door 202 open. As spool portion 210" rotates in the alternate direction, pull cord 222B closes the door 202. In the embodiment of the system shown in FIG. 6I, spool portion 210" acts as a form of pulley, with the pull cord 222B either pulling the door 202 open or closed, depending upon the direction of rotation of spool portion 210".

Thus, as shown in FIGS. 6H-J, pull cord 222A is a loop of wire or cord that goes between spool portion 210' and distal opening 220A, fixed thereto with connecting pin 562A, which opens and closes door 202, while pull cord 222B is a continuous loop of wire or cord that goes between spool portion 210" and distal opening 220A, also fixed thereto with connecting pin 562A, which opens and closes door 202, FIGS. 7A-7C are QR codes for downloading eWeLink and Alexa apps from the internet.

The following steps are useful for an Initial Account Set Up:

1. Download eWeLink app using the QR Code as shown in FIG. 7A
2. Register your account using your mobile phone number or email address
3. Hit the "+" icon to add the device, then select compatible pairing mode (easiest)
4. On the circuit board controller, hold either of the two buttons down until the light blinks at a constant steady rate (1 flash/second)
   a. If the light flashes 3-4 times, pauses then repeats, hold the button down again until it changes flashing rate
5. Go into the wifi settings on your phone and select the WIFI beginning with ITEAD (if it prompts for a password, enter 12345678)
6. Return to the eWelink app, click next, then enter your wifi credentials (remember only 2.4 gHz networks are supported)
7. Once your device is set up, name it, then go into the settings to rename the channels from Ch 1 and Ch 2 to "Close Door_" and "Open Door_".

In an initial step, a User can download the Alexa app by Amazon from either the Google Play storefront using the QR Code as shown in FIG. 7B or the Apple Store using the QR Code as shown in FIG. 7C.

The following subsequent steps are used for an Amazon Account Pairing:

8. In the Amazon Alexa App, click on the three lines in the top left corner to open up the side bar menu and click Skills and Games
9. In the search bar type "eWeLink" and select the one created by eWeLink Smart Home
10. Select enable to use and log into your newly created account.

The following steps are used for an Amazon Routine Creation:

11. Returning to the home screen and clicking the top lines in the top left corner to bring the side bar menu back up, click Routines.
12. Hit the + button in the top right corner and name the routine.
13. Hit the plus button in the middle box where it says "When this happens" and click Voice in the menu option.
14. Enter the phrase "open Door_" and click next
15. In the Add action tab, click the + symbol, click on the option that says Smart Home and find your device labeled "Open Door_"
16. Save the routine.
17. Repeat steps 11-16, this time naming the routine differently, using the phrase "Close Door_" and selecting the device labeled "Close Door_".

It will be noted that while the non-contact, automatic door hinge operator device 200 of the present invention can be used for opening and closing residential interior or exterior doors, spring-loaded or gravity-closing casement-type or double-hung windows, commercial door, exits, hatches and access plates, vehicle and vessel doors and hatches, refrigerator, oven, washing machine, dryer and other appliance doors and lids, industrial and manufacturing plants, processes and facilities, etc.

Furthermore, smart connect sensors such as the "Wyze Sense"-brand small contact and motion sensor such as found at https://wyze.com/wyze-sense.html can be used in conjunction with the door hinge operator system 100 of the present invention. These devices can be placed on or adjacent a door 102 of 202 or any other structure or location, and they communicate to a user whether something is open or closed based whether the two sensors are in contact or not. This type of sensor can be used to let the controller 110 or 240 know when the door is open or closed. Then, if the door is already open and the controller receives a voice command, bluetooth signal or other instruction that would "open the door", since the door is open the controller or other switch could cut off the signal and not allow the switch to power the motor, thus preventing the pull cord from over stretching or breaking.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A non-contact, automatic door hinge operator system that both opens and closes a door attached to an adjacent wall with hinges, the door hinge operator system comprising:

- a spool motor mechanism mounted onto the wall adjacent a hinge edge side of the door, the spool motor mechanism having a rotating spool portion, the spool motor mechanism slightly set off from the wall;
- a controller for controlling the rotation of the spool portion, the controller comprising switching means for providing an electrical current to the spool motor mechanism to rotate the spool portion in either a clockwise direction or a counterclockwise direction;
- an access point located on the door distally from the spool mechanism and adjacent a swinging edge side of the door;
- a looped pull wire extending between the rotating spool portion and the access point on the door;
- a coupling means for coupling the looped pull wire to the access point of the door, such that the switching means of the controller sends an electrical current to the spool motor mechanism which causes rotation of the spool portion in a first direction to retract the pull wire and open the door and the switching means of the controller sends an electrical current to the spool motor mechanism which causes rotation of the spool portion in a second direction to retract the pull wire and close the door; and
- a first smart connect sensor attached to the wall adjacent the door and a second smart connect sensor attached to the door, wherein the first and second smart sensors let the controller know whether the door is open or closed based upon whether the first sensor and the second sensor are in contact.

2. The non-contact, automatic door hinge operator system of claim 1 wherein the pull wire comprises a continuous loop of material.

3. The non-contact, automatic door hinge operator system of claim 1 wherein the controller is actuated using a non-contact sensor switch.

4. The non-contact, automatic door hinge operator system of claim 1 wherein the controller is actuated using a voice-actuated switching means.

5. The non-contact, automatic door hinge operator system of claim 1 wherein the controller is actuated using an app installed on a mobile computing device.

6. The non-contact, automatic door hinge operator system of claim 5 wherein the app sends control signals to the controller.

7. The non-contact, automatic door hinge operator system of claim 1 wherein the controller is actuated using a control signal selected from the group of control signals consisting of low voltage, bluetooth, cellular, infrared, radio frequency and electromagnetic impulse.

8. The non-contact, automatic door hinge operator system of claim 1 further comprising a contact switch, when the door is in a fully open position, the contact switch signals the controller to stop rotation of the spool portion and thereby prevent over tightening of the pull wire.

9. The non-contact, automatic door hinge operator system of claim 1 further comprising a contact switch, when the door is in a fully closed position, the contact switch signals the controller to stop rotation of the spool portion and thereby prevent over tightening of the pull wire.

10. The non-contact, automatic door hinge operator system of claim 1 in which the rotating spool portion has first and second sections, wherein as the spool portion rotates in one direction, the pull wire unwinds from the first section and winds onto the second section, and as the spool portion rotates in the other direction, the pull wire unwinds from the second section and winds onto the first section.

* * * * *